(12) United States Patent  
Nakamura et al.

(10) Patent No.: US 7,149,205 B2  
(45) Date of Patent: Dec. 12, 2006

(54) INTERFERENCE DETECTION METHOD AND INTERFERENCE AVOIDANCE SYSTEM FOR WIRELESS COMMUNICATION LINKS

(75) Inventors: Osamu Nakamura, Yokosuka (JP); Shinji Uebayashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 953 days.

(21) Appl. No.: 10/153,897

(22) Filed: May 24, 2002

(65) Prior Publication Data

US 2002/0176364 A1    Nov. 28, 2002

(30) Foreign Application Priority Data

May 25, 2001 (JP) .............................. 2001-157792

(51) Int. Cl.
*H04J 1/00* (2006.01)
(52) U.S. Cl. ..................... 370/343; 370/347; 455/296
(58) Field of Classification Search ................. None
See application file for complete search history.

(56) References Cited

U.S. PATENT DOCUMENTS

| | | | |
|---|---|---|---|
| 5,222,106 A * | 6/1993 | Satoh et al. ................ | 375/349 |
| 5,649,303 A | 7/1997 | Hess et al. | |
| 5,884,145 A | 3/1999 | Haartsen | |
| 6,256,477 B1 * | 7/2001 | Eidson et al. .............. | 455/63.3 |
| 6,304,594 B1 * | 10/2001 | Salinger ..................... | 375/222 |
| 6,873,607 B1 * | 3/2005 | Hamada et al. ............. | 370/321 |

FOREIGN PATENT DOCUMENTS

| | | |
|---|---|---|
| JP | 63-180229 | 7/1988 |
| JP | 6-291723 | 10/1994 |
| JP | 11-69426 | 3/1999 |
| JP | 2000-102061 | 4/2000 |
| JP | 2000-316180 | 11/2000 |
| JP | 2003-501908 | 1/2003 |
| WO | WO 99/60728 | 11/1999 |
| WO | WO 00/74415 | 12/2000 |

* cited by examiner

*Primary Examiner*—Duc Ho  
(74) *Attorney, Agent, or Firm*—Oblon, Spivak, McClelland, Maier & Neustadt, P.C.

(57) ABSTRACT

In the case where two wireless communication systems are located close to each other and possibly interfere with each other, it is detected if broad band interference takes place, and, when broad band interference takes place, the use of frequencies is limited within such a frequency range in which the wireless communication systems are little affected by the interference. An interference detection system for detecting interference between one system and another system in a wireless communication making use of frequency division multiplexing is described. The interference detection system includes a radio frequency signal receiving unit; a signal level storing unit; a calculation result storing unit; a threshold level comparing unit; and a carrier number storing unit.

12 Claims, 11 Drawing Sheets

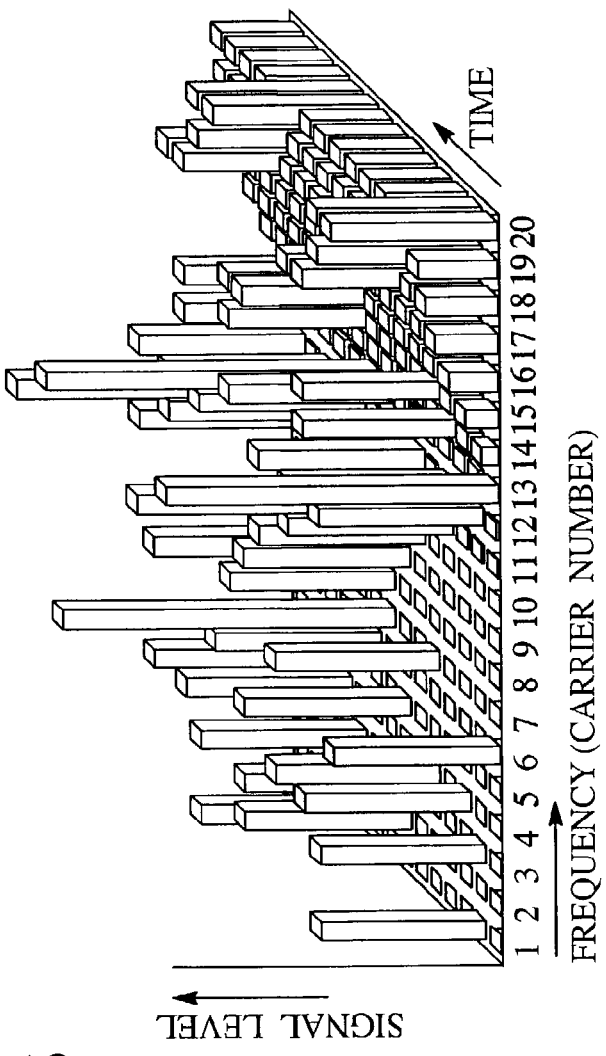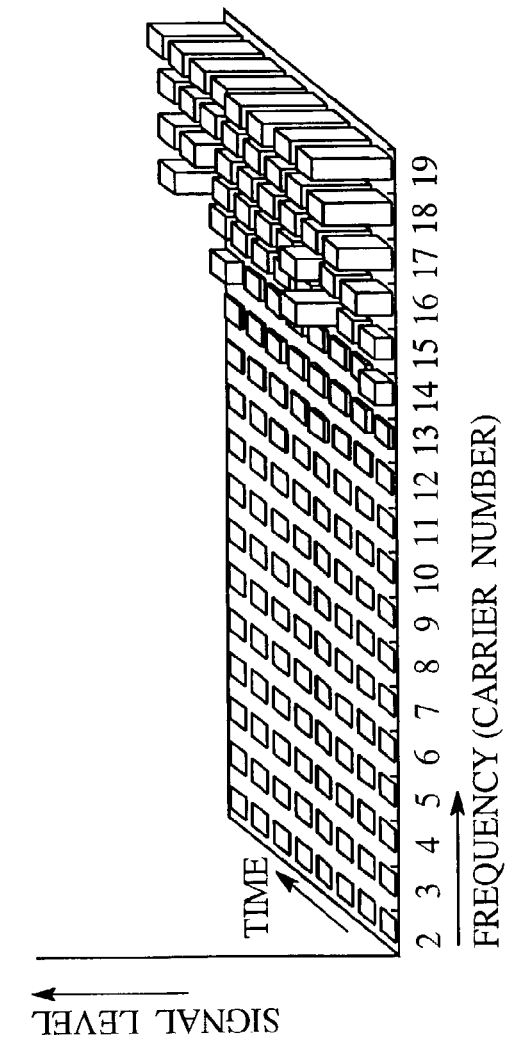
FIG.6
FIG.7

INTERFERENCE DETECTION METHOD AND INTERFERENCE AVOIDANCE SYSTEM FOR WIRELESS COMMUNICATION LINKS

CROSS REFERENCE TO RELATED APPLICATIONS

This application is based upon and claims the benefit of priority from the prior Japanese Patent Applications No. 2001-157792, filed on May 25, 2001; the entire contents of which are incorporated herein by reference.

BACKGROUND OF THE INVENTION

1. Field of the Invention

The present invention belongs to the field of wireless communication systems making use of wireless communication links and, particularly, relates to an interference detection method and an interference avoidance system for detecting interference with another wireless communication device and effectively avoiding the interference.

2. Description of the Related Art

Conventionally, there are employed, as a technique for avoiding interference with another system, the use of a filter for preventing interference with frequency bands which are not used in its own system, and the provision of a sufficient spatial interval between both systems for preventing interference with each other.

Because of this, when frequency bands are determined for use in the respective wireless communication systems within the same area in the case of the prior art techniques, there are provided guard-band intervals with which radio waves can be sufficiently attenuated by the use of a filter and the like for the purpose of preventing generation of unnecessary signals.

Also, the carrier sense access has been generally used as a technique for avoiding interference in the frequency bands of its own system by receiving radio waves in the frequency band which will be used for signal transmission and the frequency band which will be used for signal reception, in advance of actually transmitting radio frequency signals in the frequency band as predetermined for use in its own system, in order to confirm that there is no other signals which would interfere with its own system and vice versa.

There are a variety of implementations of the carrier sense access depending on the wireless communication systems as used. TDMA-TDD (Time Division Multiple Access Time—Division Duplex) will be explained as one example of the system which is being employed in PHS (Personal Handy Phone System in Japan) and the like and in which the same frequency is time divided for signal transmission and for signal reception.

In the case of TDMA-TDD, a single frequency carrier is timely divided into a plurality of time slices. The respective slices are called as time slots. Furthermore, which of the downlink used by a wireless base station for signal transmission and the uplink used by the wireless base station for signal reception is determined for each time slot. For example, in the case of PHS as described above, 5 ms is divided into eight time slots in order that each successive four time slots are assigned to the uplink channel and the downlink channel in turn.

Also, in the case of TDMA-TDD, a plurality of frequencies are available so that each wireless communication link for use is defined by combination of frequencies and time slots of 5 every ms. In the case of making use of a wireless communication link, a wireless communication device such as a wireless base station receives, in advance of actual signal transmission, a time slot for use in correspondence with the frequency of the wireless communication link for use and the time as predetermined for use in order to confirm that the received signal level of the wireless communication link is no higher than a predetermined level.

In this case, however, if a signal higher than the predetermined level is received via the communication link as predetermined for use, the wireless communication link is changed to another wireless communication link followed by repeating signal reception. This procedure is repeated until such a wireless communication link is found as the signal received level is no higher than the predetermined level, and then it becomes possible to make use of the wireless communication link without fear of interference.

Also, if there occurs anew interference with another wireless communication device, for example, in the case of a mobile communication while a mobile wireless communication device (referred to as a mobile terminal in the following description) moves, it is possible to detect the deterioration of the communication link quality by monitoring the data error rate and to initiate "channel switching" by switching the wireless communication link to another wireless communication link free from interference in order to avoid interference.

On the other hand, in accordance with an interference detection mechanism in a wireless communication device of the TDMA-TDD system, it is possible to measure signal levels for the respective "frequencies (carrier numbers)" and the respective "times (the time slots)" as illustrated in FIG. 3 by making use of a wireless communication device equivalent to that for use in communication and available time slots other than time slots for current use in communication in order to measure the received signal level for each frequency and each time slot.

However, in the case where there are two different wireless communication systems in the same area, it is necessary to distinguish the frequencies for use from one another and to provide a guard-band interval between the respective systems. On the other hand, from the view point of making effective use of the frequency resource, there is a need for setting the guard-band interval as narrower as possible, However, for example, in the case where the frequency resource is allocated on the basis of an international scheme, it may be the case that sufficient guard-band intervals can not be provided between an existing domestic system and a new international system. In the case where a filter is used to attenuate radio waves outside of its own frequency band, the size of the filter as required becomes large in the case where the guard-band interval is decreased while it is difficult to sufficiently attenuate radio waves outside of its own frequency band in the case where a filter is used for this purpose.

However, since it is not always possible to identify the location of the wireless communication device which may suffer from interference, ample guard-band intervals are provided, even if there is entirely no interference in most locations, for the purpose of avoiding interference which would take place when two wireless communication stations are located close to each other, resulting in ineffective utilization of the frequency resource.

In order to solve the shortcomings, if variable guard-band intervals are used in the individual areas and between the respective systems in which interference may become problematic instead of the use of the same width of the guard-band intervals for all of the areas, there arises another problem that the wireless communication equipments of two different systems can not be installed independent from each other.

Practically speaking, it is difficult to individually control a number of wireless communication equipments and to individually limit the use of a problematic band. Meanwhile, it is possible to avoid interference by detecting interfering waves in the frequency for use in advance of actually making use of a wireless communication link in accordance with the carrier sense access as described above as a prior art technique. However, in the case where there is interference by spurious components as transmitted from a wireless communication device of an adjacent system and spread over a wide frequency range, interference is detected over the wide frequency range as illustrated in FIG. 2 when the carrier sense access described above as a prior art technique is used, so that there is a problem that a substantial time is needed to search an available frequency in practice.

In the following description, conventional problems will be explained with the interference detection method in the case of a public PHS base station equipment as an example. In this example as illustrated in FIG. 2, a wireless communication system A is a PHS while a wireless communication system B is an IMT-2000 system. There is a guard-band interval of about 5 MHz between these two systems. Also, the frequency band of the IMT-2000 system closest to the frequency bands of the PHS is used to transmit signals from a mobile terminal to the base station equipment.

In usual cases, radio waves outside of the frequency band due to transmission signals B1 from the wireless communication device of the wireless communication system B is sufficiently suppressed within the guard-band interval by the use of a filter and the like in order not to cause interference with the wireless communication system A. However, in the case where the wireless communication devices of both systems are located very close to each other, radio waves from the transmission signal B1 outside of the frequency band affects the system A as broad band interference.

The signals of the IMT-2000 system are timely continuous and have broad spectrum as compared with the PHS. The signals of the PHS are transmitted as frames each of which consists of eight time slots by time division of the frequencies of the respective carrier numbers distant from each other with 300 KHz. In the base station equipments of the PHS, since the carrier numbers and the time slots for use are dynamically assigned to the respective mobile stations by each base station equipment, the carrier sense access procedure is performed in advance of actual signal transmission, when the wireless communication link is used, in order to confirm that there is no signal in the frequency of the carrier number for use and the time slot for use.

However, in the case posed here as problematic, i.e., where there are interfering signals spread over a wide frequency area (over a plurality of carrier numbers), it is possible to detect interference for the respective time slots but not possible to distinguish the interference from each signal transmitted in a narrow frequency band in accordance with time division multiplexing for effectively avoiding the interference.

Accordingly, it is an object of the present invention to solve the problem as described above and to provide a method and a wireless communication device in which, in the case where two wireless communication systems are located close to each other and possibly interfere with each other, it is possible to detect if broad band interference takes place, and, when broad band interference takes place, to limit the use of frequencies within such a frequency range in which the wireless communication systems are little affected by the interference, and therefore to automatically and effectively avoid interference, resulting in a narrower guard-band interval effective between the two systems.

BRIEF SUMMARY OF THE INVENTION

The present invention has been made in order to solve the shortcomings as described above and is characterized by, when interference between one system and another system is detected in a wireless communication making use of frequency division multiplexing, measuring a received signal level for each of frequencies corresponding to carrier numbers in the one system; storing the received signal levels as measured in association with the respective carrier numbers; generating a measured level group from each (called "selected carrier number" here) of carrier numbers which are selected one after another and a plurality of carrier numbers adjacent to said each of selected carrier numbers, performing an arithmetic operation of each of the respective measured level groups, and storing each result of the arithmetic operation in association with the selected carrier number; comparing the results of the arithmetic operation as stored corresponding to the respective carrier numbers with a predetermined interference threshold level; and storing each comparison results in association with the selected carrier number.

In accordance with the present invention, interfering signals can be detected by generating a measured level group for each carrier number for use in its own system including the carrier numbers adjacent to said each carrier number, calculating a delineative level of each measured level group (the minimum level, the average level, a representative level and so forth), and therefore exceptional levels (for example, an abnormal signal level which appears only with a particular carrier number) can be removed in advance of the detection. As a result, it is possible to extract only interfering signals which are continuously generated over a wide range of frequencies.

BRIEF DESCRIPTION OF THE SEVERAL VIEWS OF THE DRAWINGS

FIG. 6 is a graphic diagram showing the levels of the interfering signal as combined.

FIG. 7 is a graphic diagram showing resultant data after obtaining minimum signal levels from adjacent m carriers.

DETAILED DESCRIPTION OF THE INVENTION

[First Embodiment]

(The Overall Configuration of the Interference Avoidance System)

Figure 1:
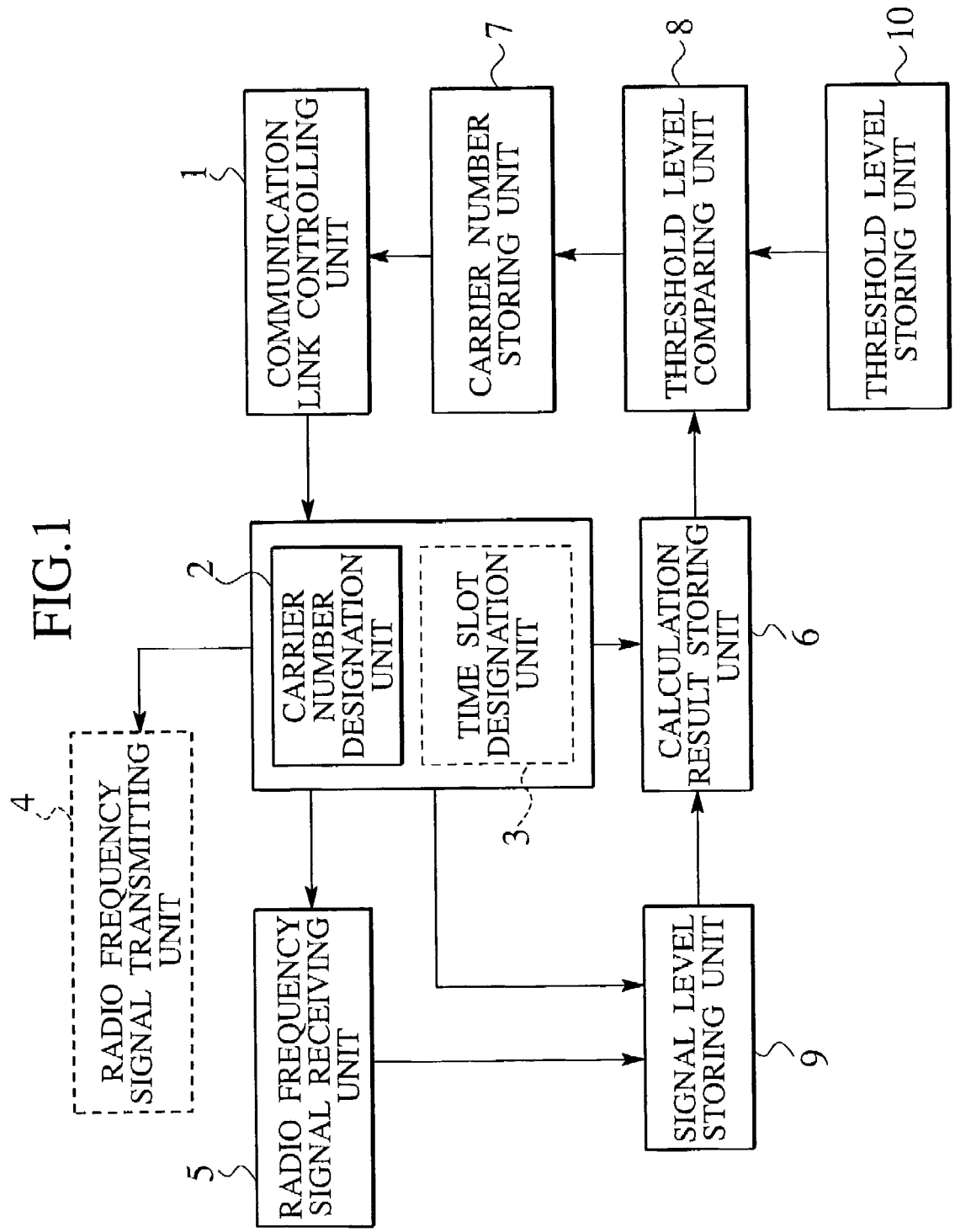
FIG. 1 is a block diagram showing the basic configuration of an interference avoidance system in accordance with the present embodiment.

In the following description, an interference avoidance system in accordance with a first embodiment of the present invention will be explained. FIG. 1 is a block diagram schematically showing the basic configuration of the interference avoidance system in accordance with the present embodiment.

The interference avoidance system in accordance with the present embodiment is composed of a communication link controlling unit 1, a carrier number designation unit 2, a time slot designation unit 3, a radio frequency signal transmitting unit 4, a radio frequency signal receiving unit 5, a calculation result storing unit 6, a carrier number storing unit 7, a threshold level comparing unit 8, a signal level storing unit 9 and a threshold level storing unit 10 as illustrated in the same figure.

The communication link controlling unit 1 controls the communication links for use in communication by the radio frequency signal transmitting unit 4 and the radio frequency signal receiving unit 5, and input control signals to the carrier number designation unit 2 and the time slot designation unit 3 to designate the carrier numbers and the time slots to be used by the radio frequency signal transmitting unit 4 and the radio frequency signal receiving unit 5.

The carrier number designation unit 2 serves to designate the carrier numbers for signal reception and transmission by the radio frequency signal transmitting unit 4 and the radio frequency signal receiving unit 5 on the basis of the control signal as input from the communication link controlling unit 1. Also, the carrier number designation unit 2 serves to output the carrier number, which is assigned to the radio frequency signal receiving unit 5, to the signal level storing unit 9 and the calculation result storing unit 6.

The time slot designation unit 3 serves to designate the time slot numbers used by the radio frequency signal transmitting unit 4 and the radio frequency signal receiving unit 5 for signal transmission and reception on the basis of the control signals as input from the communication link controlling unit 1. Also, the time slot designation unit 3 outputs the time slot number, which is assigned to the radio frequency signal receiving unit 5, to the signal level storing unit 9 and the calculation result storing unit 6.

The radio frequency signal transmitting unit 4 is a signal transmission means for transmitting radio waves to the base station during wireless communication to perform transmission of signals by the use of the frequency and the time slot as designated by the carrier number designation unit 2 and the time slot designation unit 3. The radio frequency signal receiving unit 5 is a signal reception means for receiving radio waves from the base station during wireless communication to perform reception of signals by the use of the frequency and the time slot as designated by the carrier number designation unit 2 and the time slot designation unit 3. Also, the radio frequency signal receiving unit 5 in accordance with the present embodiment has a function of measuring the signal levels of the radio frequency signals as received and outputting measurement results to the signal level storing unit 9.

Meanwhile, generally speaking, a plurality of signal receiving units are required for receiving radio frequency signals of different carrier numbers at the same time. However, since the time slot number is repeated for each frame period in the case of a wireless communication link in accordance with time division multiplexing, radio frequency signals are received while the carrier number is changed for each the frame cycle to measure the received signal levels corresponding to different carrier numbers of the same time slot number by means of a single signal receiving unit.

Also, it is possible with the radio frequency signal receiving unit 5 to measure all of the slots by temporarily receiving necessary slots and switching the signal transmission link to another slot while the current signal transmission with the carrier number and the time slot number being for use is suspended without affecting the communication. By this configuration, in accordance with the present embodiment, the signal transmitting and receiving unit for communication serves both as a signal receiving unit for communication and as a signal receiving unit for measuring signal levels rather than providing a separate signal receiving unit.

Figure 3:
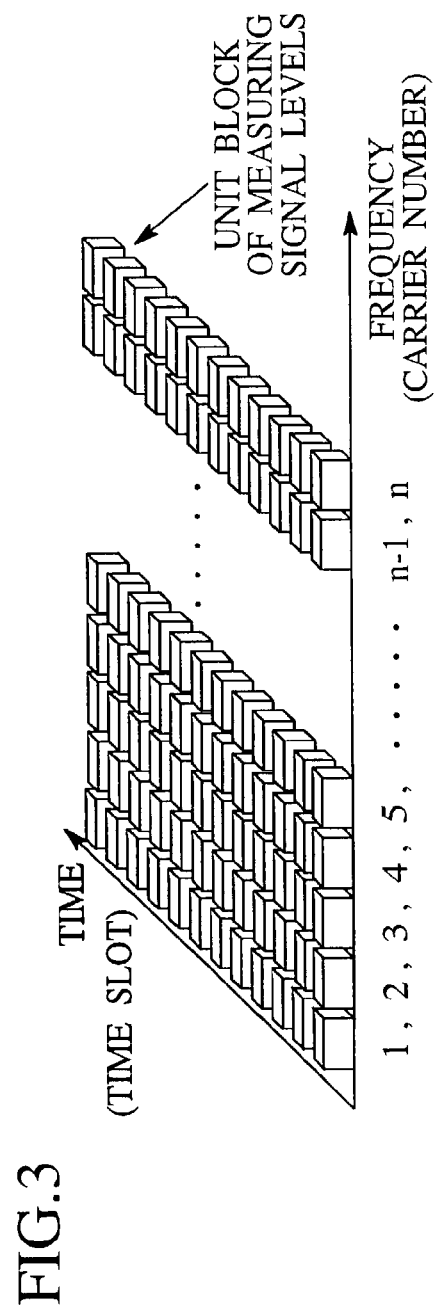
FIG. 3 is a graphic diagram for explaining unit blocks of measuring signal levels in a wireless communication making use of frequency division multiplexing and time division multiplexing.

The signal level storing unit 9 serves to store the levels of signals as measured by the radio frequency signal receiving unit 5 in association with the carrier numbers and the time slot numbers corresponding to the respective signals. This signal level storing unit 9 provides array variables M consisting of n*Ft elements, wherein n is the number of all the carriers and Ft is the number of the time slots per frame, and stores the received signal level $S_{i,t}$ corresponding to the carrier number i and the time slot number t in the array variable element $M(i,t)$. FIG. 3 shows the arrangement of time slots as unit boxes of measurement in which the respective elements of the array variables M correspond to the respective boxes.

The calculation result storing unit 6 reads out the respective received signal levels stored in the signal level storing unit 9, performs an arithmetic operation on the basis of the levels corresponding to a plurality of the carrier numbers adjacent to each carrier number and stores the results of the operation in association with the carrier numbers. Also, the calculation result storing unit 6 in accordance with the present embodiment serves to perform an arithmetic operation of the respective received signal levels for each carrier number on the basis of the levels corresponding to the time slot numbers within a predetermined range and store the results of the operation in association with the respective carrier numbers.

The arithmetic operation performed by the calculation result storing unit 6 is such as to generate a measured level group from each carrier number and a plurality of carrier numbers adjacent thereto, and to obtain the minimum level for each measured level group. Meanwhile, other possible arithmetic operations to be performed by the calculation result storing unit 6 are such as to obtain the average level from each measured level group and to determine a representative level selected from each measured level group in accordance with majority decision.

The threshold level storing unit 10 serves to store, as a threshold level, the signal level at which interference occurs. The threshold level is used to determine, in correspondence with the type of the arithmetic operation to be performed by the calculation result storing unit 6, the range of the signal level in which interference occurs and may be experimentally obtained or theoretically calculated.

Also, the threshold level comparing unit 8 reads out the threshold level stored in the threshold level storing unit 10, extracts the carrier numbers corresponding to the signal levels (the result of the operation) within the range determined by the threshold level (for example, the signal levels exceeding or falling under the threshold level) by comparing the threshold level as read with the result of the operation received from the calculation result storing unit 6, and then outputs the carrier numbers as extracted to the carrier number storing unit 7.

The carrier number storing unit 7 serves to store the carrier numbers which are obtained by comparison with the threshold level by means of the threshold level comparing unit 8, and output the carrier numbers as stored to the communication link controlling unit 1. The communication link controlling unit 1 serves to select a carrier number for use with reference to the carrier numbers obtained from the carrier number storing unit 7.

(Interference Detection Method in the Interference Avoidance System)

Next, the basic mechanism of the interference detection method in the interference avoidance system having the configuration as described above will be explained. Meanwhile, in the case of the present embodiment, it is assumed that its own system is based on a narrow band and time division system such as a PHS while another system is based on a broad band and frequency division system. Also, it is assumed that the interfering signal level of the narrow band and time division system is higher than the interfering signal level of the broad band and frequency division system.

Figure 4:
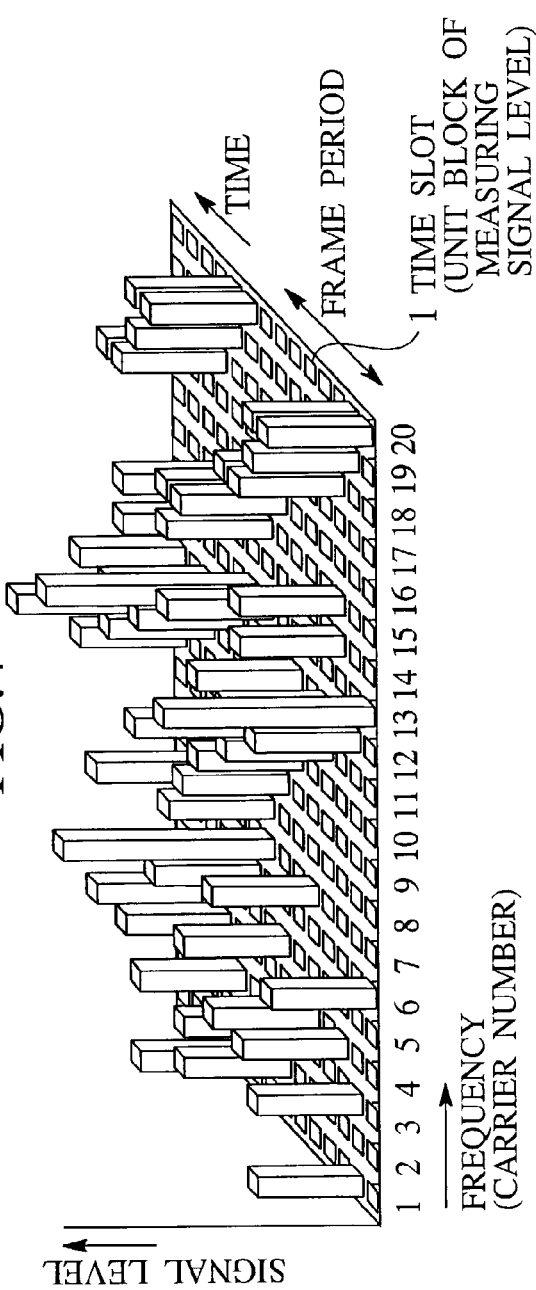
FIG. 4 is a graphic diagram showing exemplary signal levels of only narrow band interfering signal in accordance with time multiplexing.

If the interfering signals are composed only of narrow band and time division signals generated from its own system, the data as stored in the signal level storing unit 9 is as illustrated in FIG. 4. In this case, as illustrated in the same figure, the signal levels appear cyclical for a short time, e.g., for several tens of frames (the frame period is usually in the order of 10 ms). in the order of On the other hand, if the interfering signals are composed only of broad band signals which are generated from another system and have no timely correlation, the signal levels are as illustrated in FIG. 5.

Figure 5:
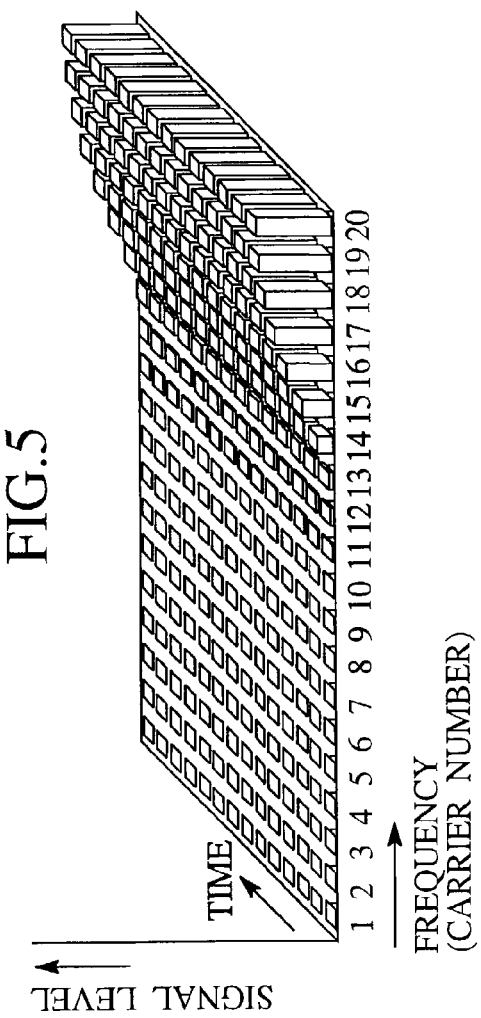
FIG. 5 is a graphic diagram showing exemplary signal levels of only broad band and time independent interfering signals.

However, in the actual case, the transmitted signals as illustrated in FIG. 4 and the interfering signals as illustrated in FIG. 5 are received at the same time and added together so that the data as stored in the signal level storing unit 9 is as illustrated in FIG. 6.

Since the signals of both systems are mixed in this configuration, it is impossible to recognize the existence of the broad band interfering signals. However, by performing selection of the minimum level among from the signal levels stored in a plurality of storage elements of the signal level storing unit 9, it is possible to presume and detect the existence of the broad band low level interfering signals.

The selection of minimum levels is implemented, for example, by ① generating a measured level group consisting of a plurality of adjacent carrier numbers an obtaining a minimum level from the measured level group, ② generating a measured level group consisting of all of the time slots belonging to one carrier number and obtaining a minimum level from the measured level group, ③ generating a measured level group consisting of all of the time slots belonging to a plurality of adjacent carrier numbers and obtaining a minimum level from the measured level group, and ④ generating a measured level group consisting of a predetermined number of the time slots belonging to a plurality of adjacent carrier numbers and obtaining a minimum level from a measured level group.

Meanwhile, in the case of the present embodiment, the method of obtaining a minimum level from the respective time slots (the above described ②), and the method of obtaining a minimum level from a plurality of adjacent carrier numbers (the above described ③) will be explained.

As an example of the collection of the minimum levels as obtained, FIG. 7 shows data as stored in the calculation result storing unit 6 after obtaining minimum signal levels from measured level groups each of which is generated from a carrier number and a pair of carrier numbers adjacent thereto on the basis of the interfering signals as illustrated in FIG. 6.

Figure 8:
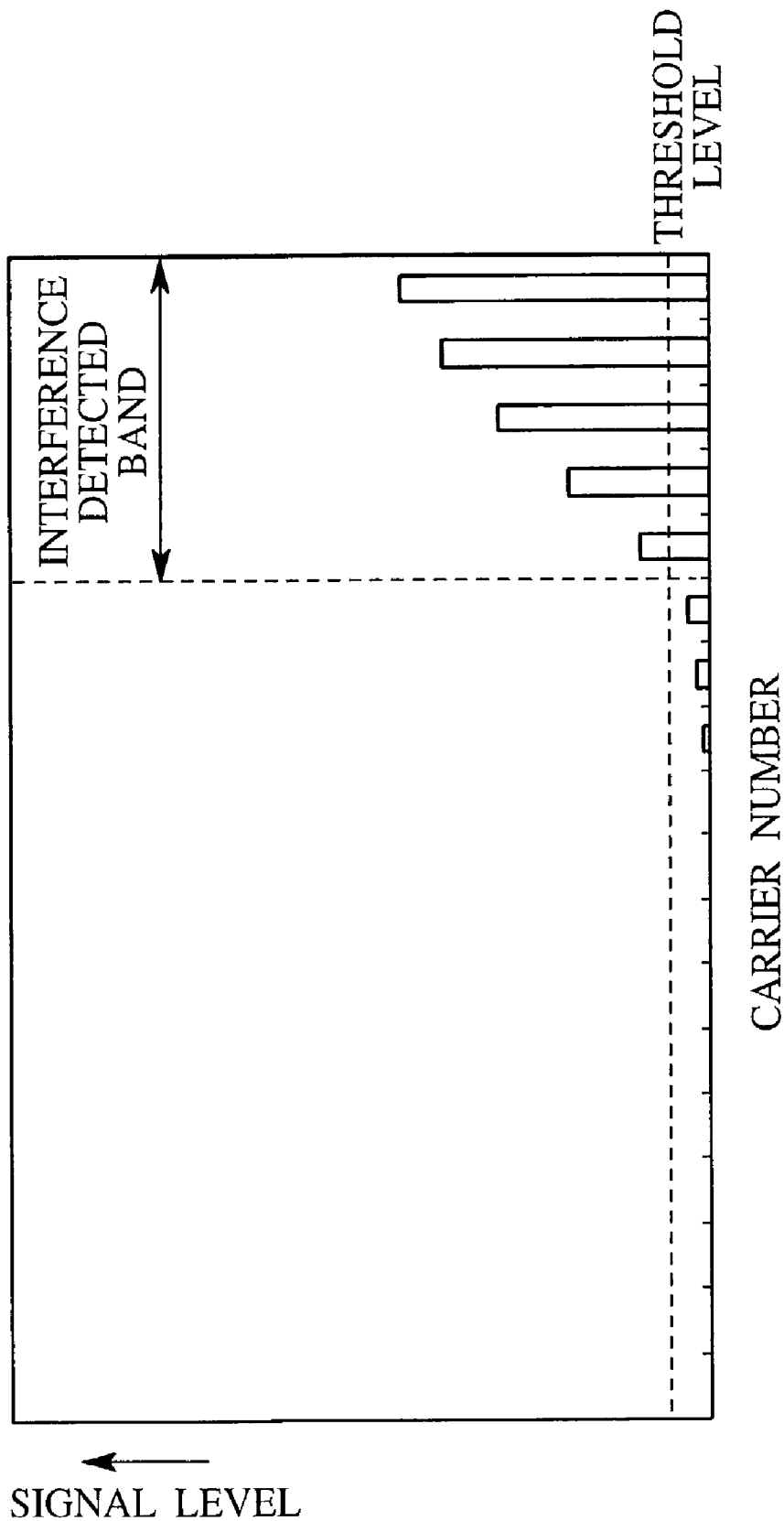
FIG. 8 is a graphic diagram showing the interfering signal levels as detected of the broad band and time independent interfering signals.

Then, from the configuration of FIG. 7, the minimum level of all of the time slots belonging to each frequency is obtained as illustrated in FIG. 8. As a result, the interfering signal level distribution which is independent of time as illustrated in FIG. 5 is reconstructed. It is possible to determine a frequency band susceptible to interference by comparing the signal levels of the respective signals as illustrated in FIG. 8 with the interference threshold level stored in advance.

Figure 2:
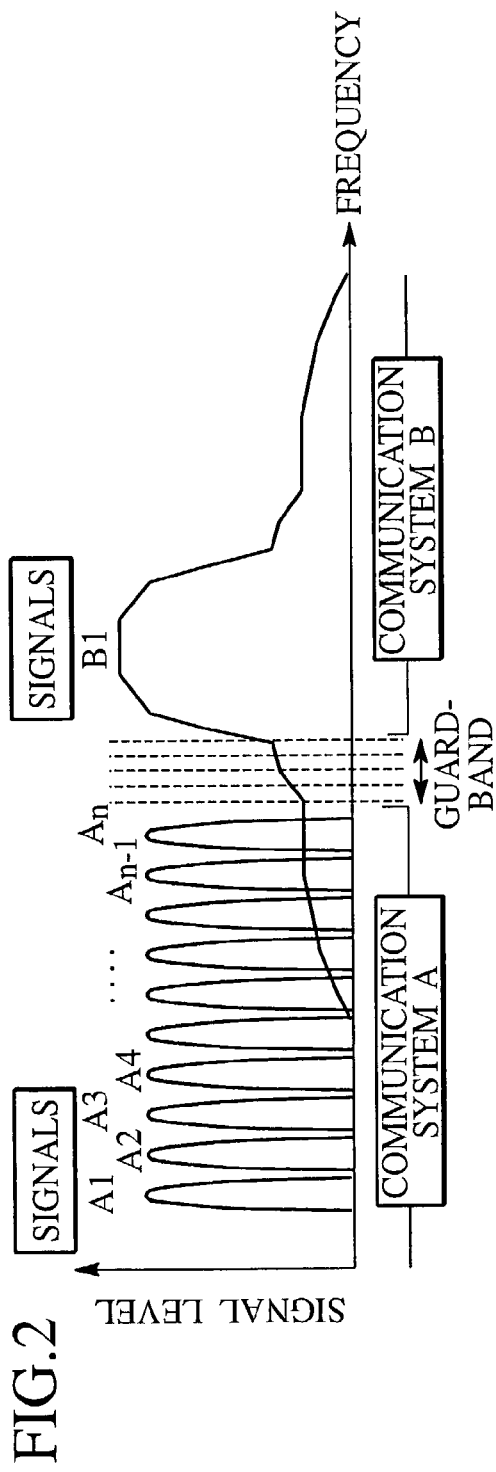
FIG. 2 is a graphic diagram showing an example of interference between a wireless communication system A (the system of the present invention) and a wireless communication system B (another system).

Meanwhile, while the interfering signals monotone increasing toward the edge of the system band is used as an example for explanation in this description, it is possible in accordance with the present invention to detect broad band and time independent interfering signals within any frequency band used in the system A (FIG. 2). Also, while FIG. 4 to FIG. 7 are illustrated such that the number of carriers n=20 and the number of time slots per frame Ft=8, the present invention is not limited thereto.

(Link Controlling Method in the Communication System)

Figure 9:
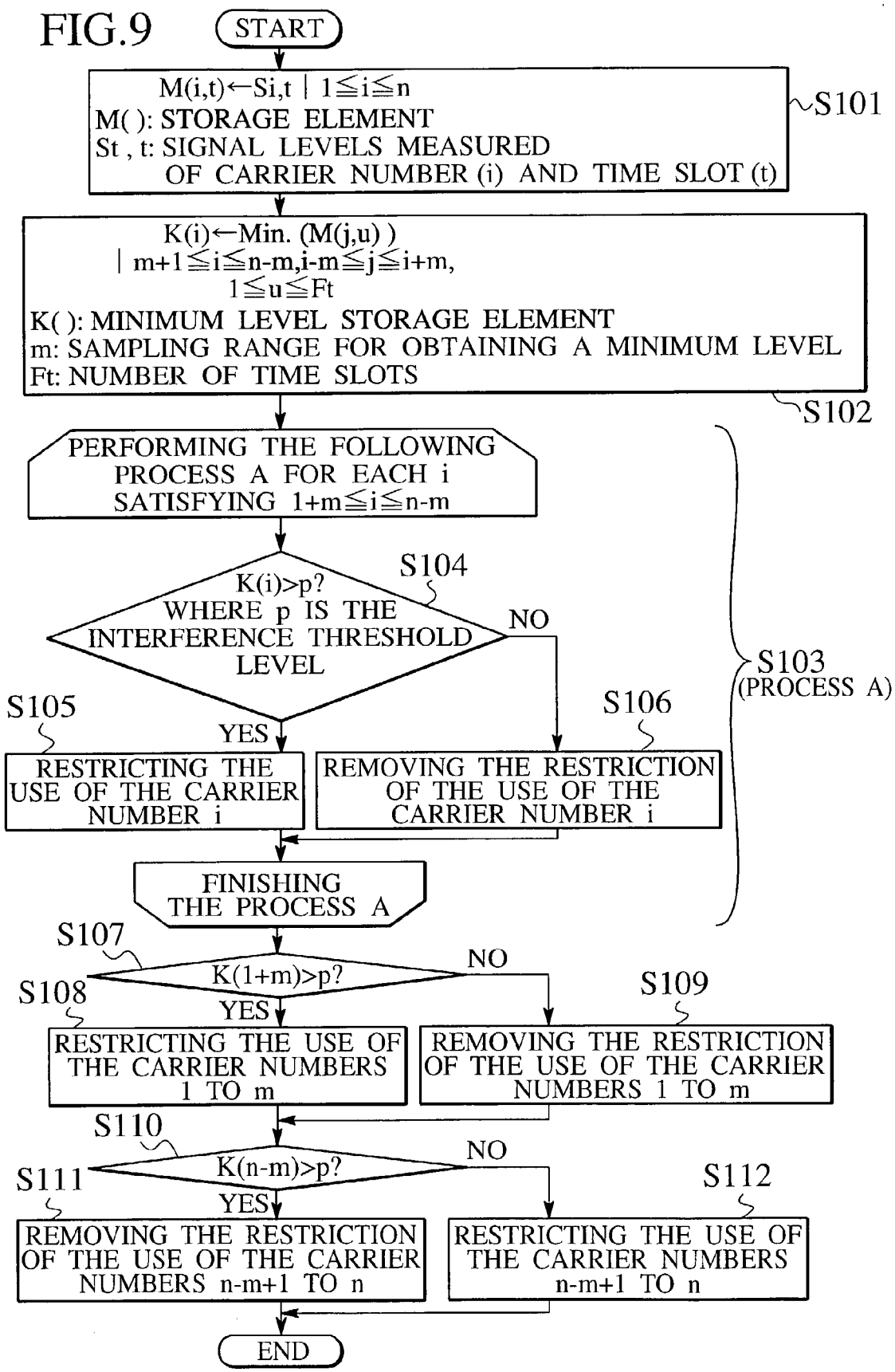
FIG. 9 is a flowchart showing the procedure for a first embodiment of the present invention.
Figure 10:
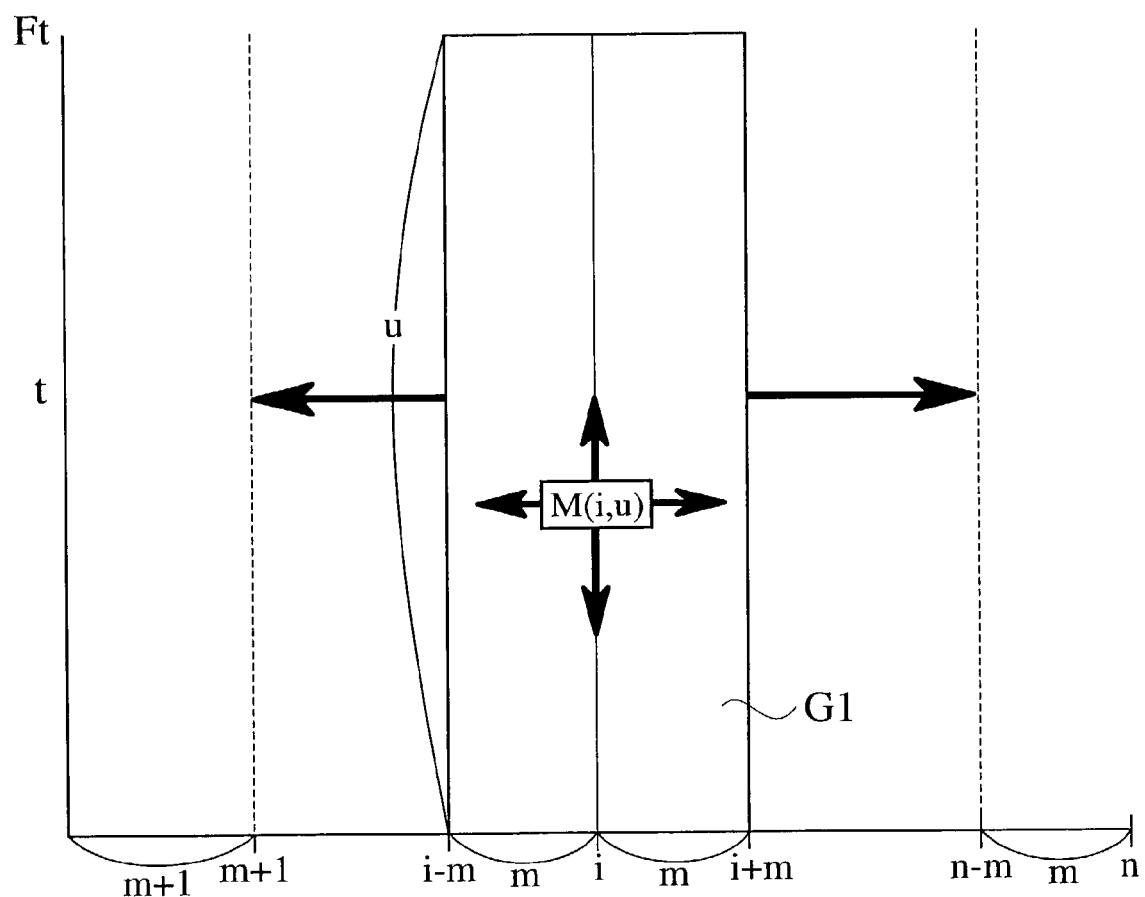
FIG. 10 is an explanatory view for schematically showing the arithmetic operation in the first embodiment.

A link controlling method using the communication system as described above will be explained in the following description. FIG. 9 is a flowchart showing the procedure of the link controlling method in accordance with the present embodiment. FIG. 10 is a schematic representation showing the procedure of an arithmetic operation in accordance with the present embodiment. In the case of the present embodiment, the signal level storing unit 9 and the calculation result storing unit 6 are represented respectively by two-dimensional array variables $M(i,t)$ associated with the carrier number i and the time slot number t and one-dimensional array variables $K(i)$ associated only with the carrier number i.

First, as illustrated in FIG. 9, the signal levels $S_{i,t}$ are measured of all the time slot (t) belonging to each carrier number (i: $1 \leq i \leq n$), and stored in the storage elements $M(i,t)$ of the signal level storing unit 9 in the step 101.

Next, the measured levels stored in the storage elements within a predetermined range, as a measured level group, are subjected to the arithmetic operation, followed by storing the result of the operation in the calculation result storing unit 6 in the step 102. More specifically speaking, for each carrier number (i), a measured level group G1 is generated from all of the time slots (each time slot number u thereof satisfies u: $1 \leq u \leq Ft$) of the carrier number (i) and previous m and subsequent m carriers as illustrated in FIG. 10, followed by obtaining the minimum level from $(2m+1) \times u$ measured levels included in each measured level group G1. Namely, each element K(i) of the array K for the respective i satisfying $m+1 \leq i \leq n-m$ is used to store the minimum level selected among from the levels M(j,u) of all the time slots belonging to the carrier number j satisfying $i-m \leq j \leq i+m$.

Next, the respective element K(i) (where $m+1 \leq i \leq n-m$) is compared with the threshold level for limiting the carrier numbers available for use in the step 103 as a process A. More specifically explaining, in the process A, it is judged which of the respective element K(i) and the threshold level stored in the threshold level storing unit 10 is larger than the other in the step 104. If the element K(i) is larger than the interference threshold level p, the carrier number is stored in the carrier number storing unit 7 while the use of the carrier number is restricted in the communication link controlling unit 1 in the step 105. Contrary to this, if $K(i) \leq p$ in the step 104, the restriction of the use of the carrier number i is removed in the step 106.

Thereafter, the use of the carrier numbers 1 to m is restricted in accordance with the result of judgment relating to the carrier number m+1 in the step 107 to the step 109 while the use of the carrier numbers n−m+1 to n is restricted in accordance with the result of judgment relating to the carrier number n−m in the step 110 to the step 112.

Meanwhile, while the frequency of judging interference is not specifically described in the present embodiment, it is possible to limit the use of the frequencies only at the time when interference is actually problematic, even in the case where interference does not always adversely exist, by judging broad band interference each time with such an interval during which averaging a plurality of frames and measuring the signal levels of all of the carrier numbers can be completed with a margin of safety.

In a simplified embodiment, when the minimum level K(i) is larger than the threshold level, the carrier number for use is selected among from other than the carrier number i, while the minimum level K(i) is not larger than the threshold level, the carrier number i can be used as the carrier number for use. Alternatively, the judgment result of comparing the minimum level K(i) with the threshold level is used as part of information available for selecting the carrier number for use.

[Second Embodiment]

Figure 11:
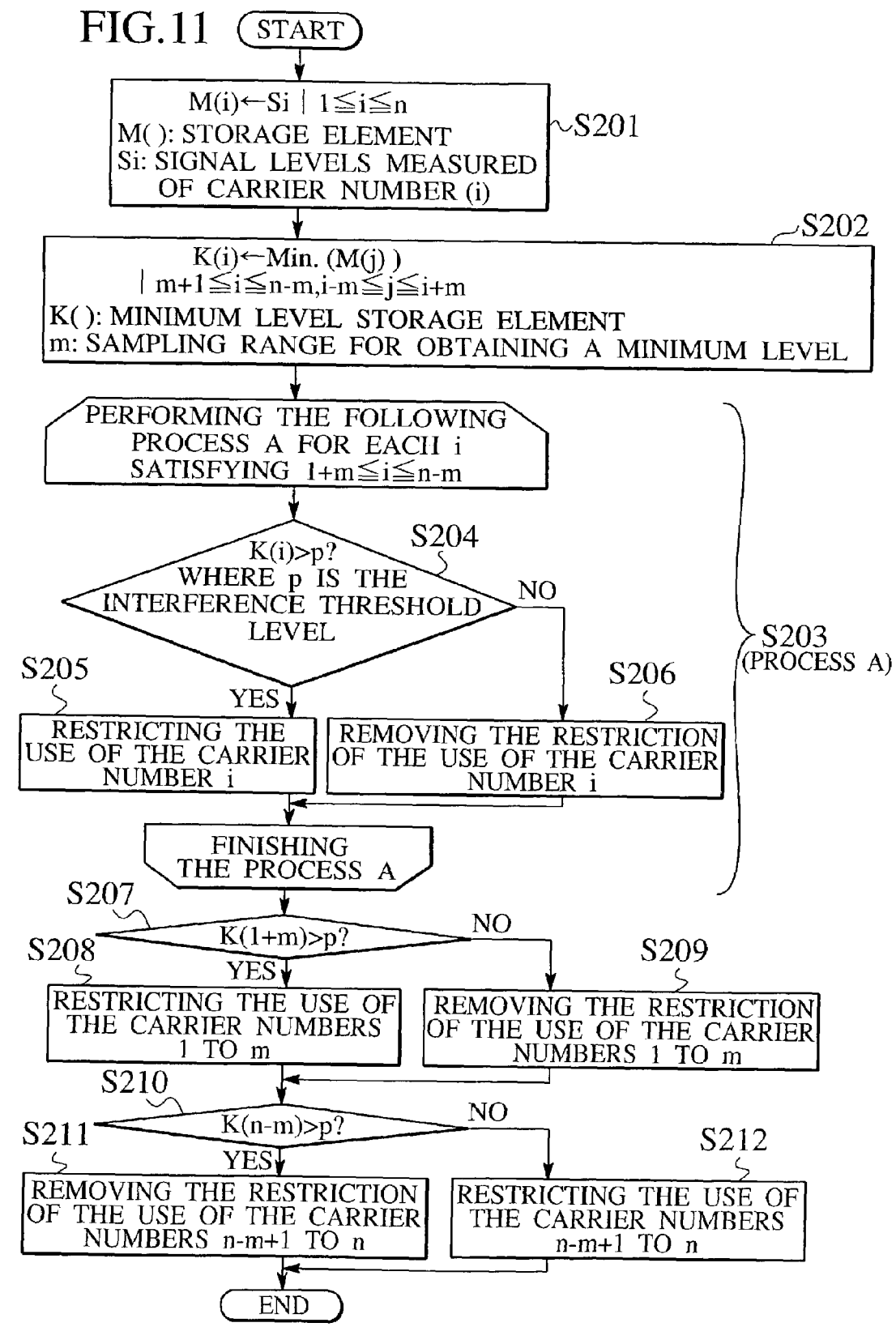
FIG. 11 is a flowchart showing the procedure for a second embodiment of the present invention.
Figure 12:
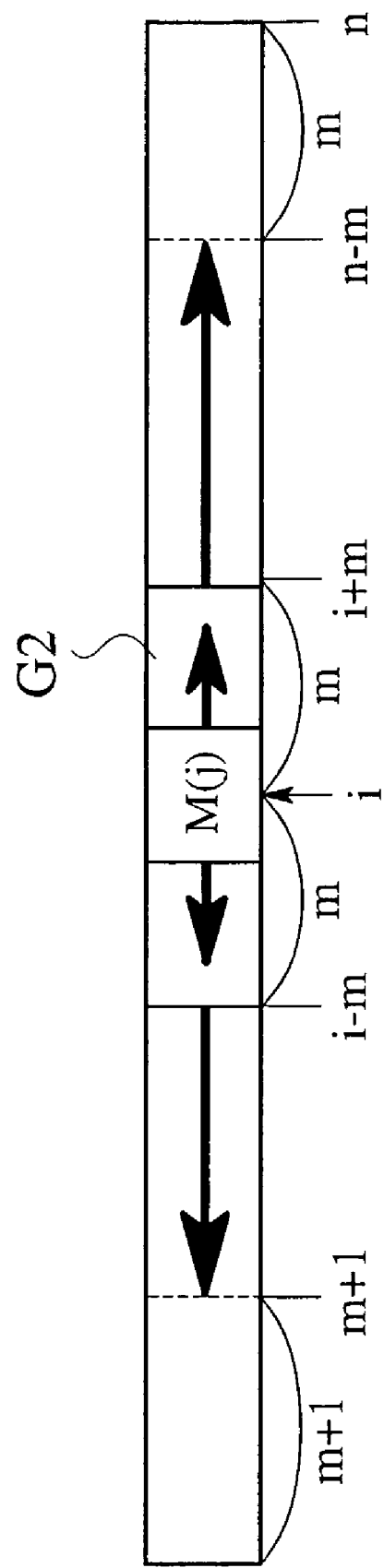
FIG. 12 is an explanatory view for schematically showing the arithmetic operation in the second embodiment.

Next, the second embodiment of the present invention will be explained. In the case of the second embodiment, the present invention is applied to another exemplary case where the wireless communication system A as illustrated in FIG. 2 is not based on time division multiplexing. In this case, while the ability of detecting interference is somewhat inferior to that of the first embodiment, the configuration thereof can be simplified. FIG. 11 is a flowchart showing the procedure of the interference detection method in accordance with the second embodiment of the present invention. FIG. 12 is a schematic representation showing the procedure of the arithmetic operation in accordance with the present embodiment. Meanwhile, in this case of the second embodiment, the time slot designation unit 3 can be dispensed with in the basic configuration (FIG. 1).

First, as illustrated in FIG. 11, the signal level Si is measured of each carrier number (i: $1 \leq i \leq n$), and stored in the storage elements M(i) of the signal level storing unit 9 in the step 201.

Next, the measured levels stored in the storage elements within a predetermined range, as a measured level group, are subjected to the arithmetic operation followed by storing the result of the operation in the calculation result storing unit 6 in the step 202. More specifically speaking, for each carrier number (i), a measured level group G2 is generated from the carrier number (i) and previous m and subsequent m carrier numbers as illustrated in FIG. 12, followed by obtaining the minimum level from (2m+1) measured levels included in each measured level group G2. Namely, each element K(i) of the array K for the respective i satisfying $m+1 \leq i \leq n-m$ is used to store the minimum level M(j) selected among from the levels of the measured level group G2 in the calculation result storing unit 6 as K(i).

Accordingly, in the case of the present embodiment, the signal level storing unit 9 and the calculation result storing unit 6 are represented respectively by one-dimensional array variables M(i) and one-dimensional array variables K(i), both being associated only with the carrier number i.

Next, the respective element K(i) (where $m+1 \leq i \leq n-m$) is compared with the threshold level for limiting the carrier numbers available for use in the step 203 as a process A. More specifically explaining, in the process A, it is judged which of the respective element K(i) and the threshold level stored in the threshold level storing unit 10 is larger than the other in the step 204. If the element K(i) is larger than the interference threshold level p, the carrier number is stored in the carrier number storing unit 7 while the use of the carrier number is restricted in the communication link controlling unit 1 in the step 205. Contrary to this, if $K(i) \leq p$ in the step 204, the restriction of the use of the carrier number i is removed in the step 206.

Thereafter, the use of the carrier numbers 1 to m is restricted in accordance with the result of judgment relating to the carrier number m+1 in the step 207 to the step 209 while the use of the carrier numbers n−m+1 to n is restricted in accordance with the result of judgment relating to the carrier number n−m in the step 210 to the step 212.

[Third Embodiment]

Figure 13:
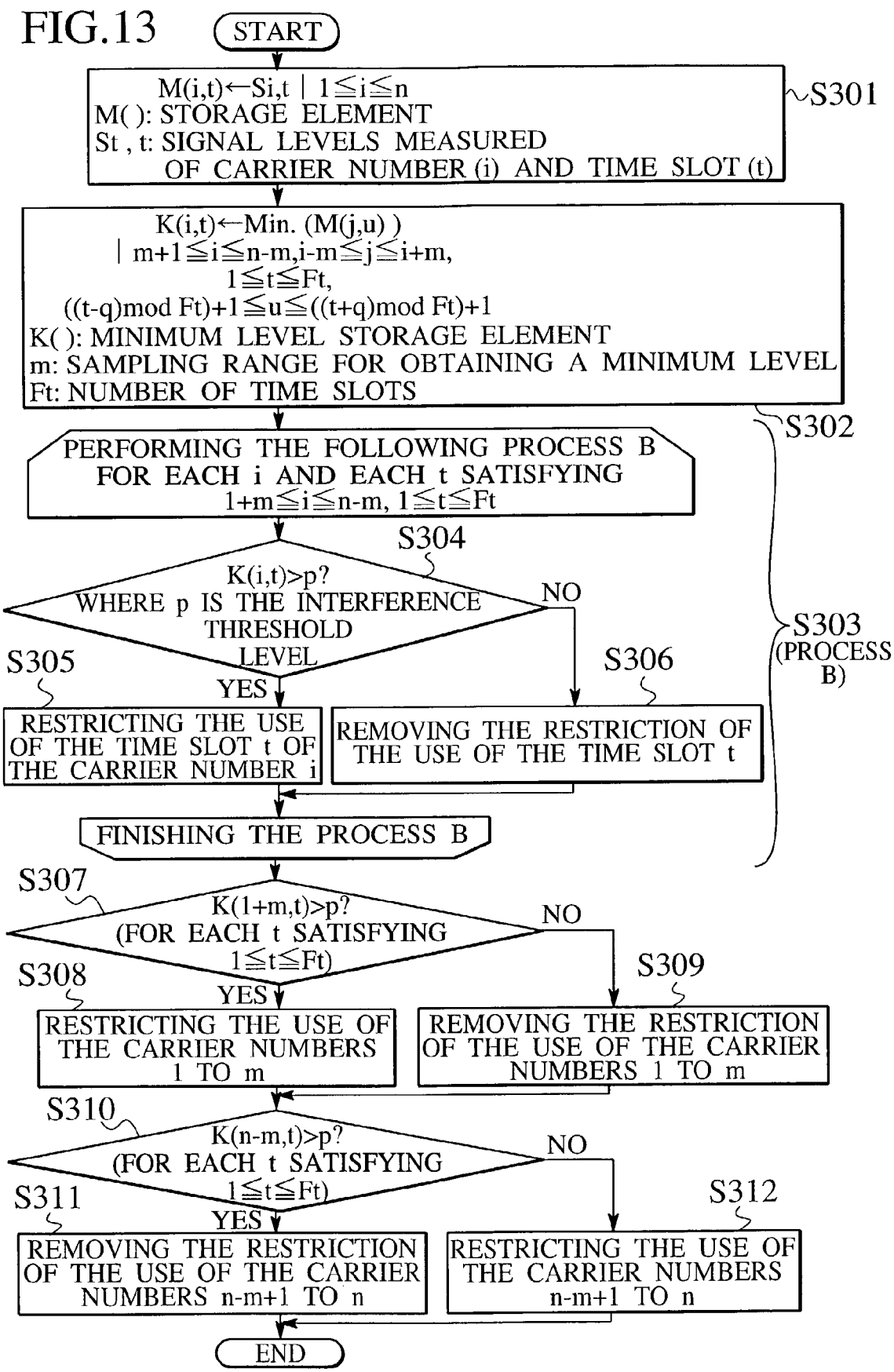
FIG. 13 is a flowchart showing the procedure for a third embodiment of the present invention.
Figure 14:
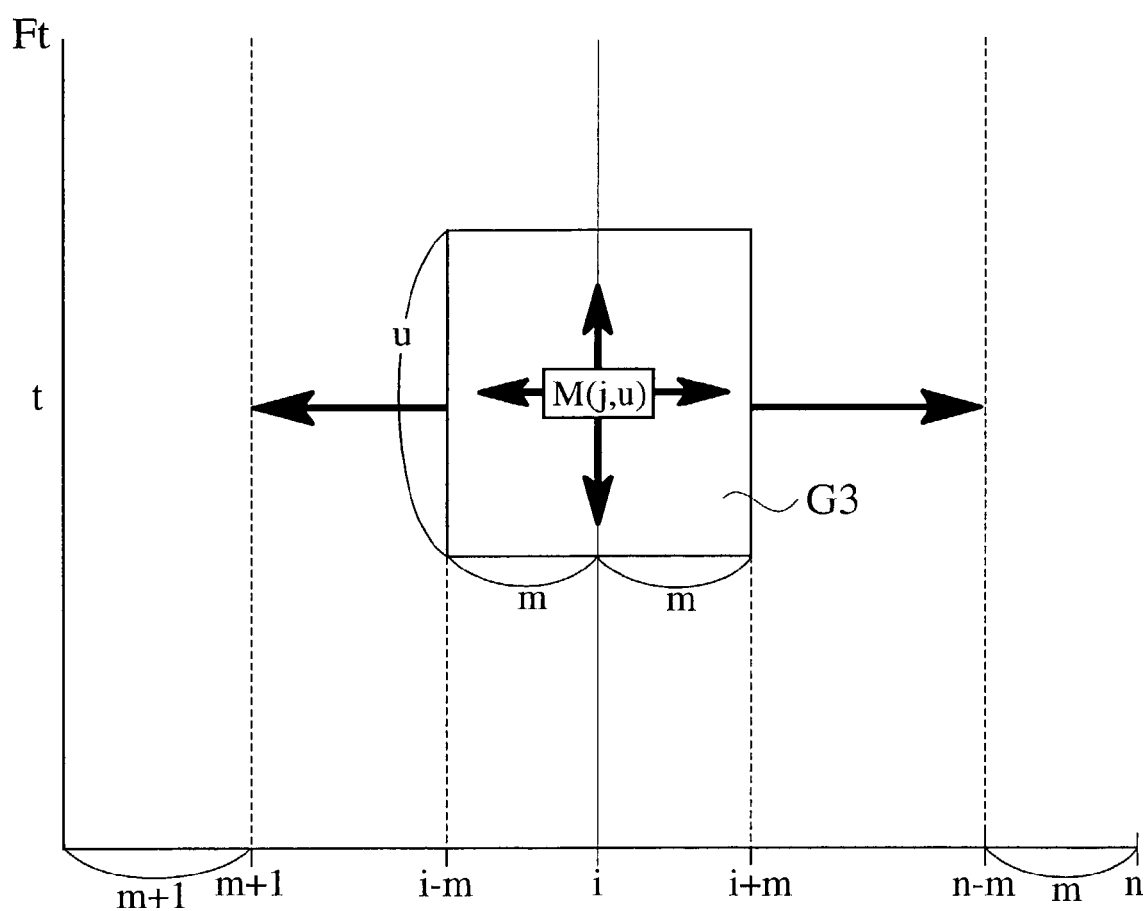
FIG. 14 is an explanatory view for schematically showing the arithmetic operation in the third embodiment.

Next, the third embodiment of the present invention will be explained. FIG. 13 is a flowchart showing the procedure of the interference detection system in accordance with the present embodiment. FIG. 14 is a schematic representation showing the procedure of the arithmetic operation in accordance with the present embodiment. This embodiment is effective also when time sharing signals are used also in the wireless communication system B (FIG. 2) which is another system, in the situation of the first embodiment. The present embodiment is distinguished from the first embodiment as described above by the details of selecting minimum levels in which a minimum level is obtained from a predetermined number (plural) of time slots rather than all of the time slots.

In the case of the present embodiment, the signal level storing unit and the calculation result storing unit 6 are represented respectively by two-dimensional array variables M(i,t) associated with the carrier number i and the time slot number t and two-dimensional array variables K(i,t) associated also with the carrier number i and the time slot number t.

First, as illustrated in FIG. 13, the signal levels Si,t are measured of all the time slot (t) belonging to each carrier number (i: $1 \leq i \leq n$), and stored in the storage elements M(i,t) of the signal level storing unit 9 in the step 301.

Next, the measured levels stored in the storage elements within a predetermined range, as a measured level group, are subjected to the arithmetic operation followed by storing the result of the operation in the calculation result storing unit 6 in the step 302. More specifically speaking, for each carrier number (i), a measured level group G3 is generated from the time slots (each time slot number u thereof satisfies ((t−q)

mod Ft)+1≦u≦((t+q) mod Ft)+1) of the carrier number (i) and previous m and subsequent m carriers as illustrated in FIG. 14, followed by obtaining the minimum level from (2m+1)×u measured levels.

Namely, each element K(i,t) of the array K for the respective i satisfying m+1≦i≦n−m and 1≦t≦Ft is used to store the minimum level selected among from the levels M(j,u) included in the measured level group G3 which consists of the time slots satisfying i−m≦j≦i+m and ((t−q) mod Ft)+1≦u≦((t+q) mod Ft)+1, wherein n is the number of all the carriers and Ft is the number of the time slots per frame as measured.

Next, the respective element K(i) (where m+1≦i≦n−m) is compared with the threshold level for limiting the carrier numbers available for use in the step 303 as a process B. More specifically explaining, in the process B, it is judged which of the respective element K(i) and the threshold level stored in the threshold level storing unit 10 is larger than the other in the step 304. If the element K(i) is larger than the interference threshold level p, the carrier number is stored in the carrier number storing unit 7 while the use of the carrier number is restricted in the communication link controlling unit 1 in the step 305. Contrary to this, if K(i)≦p in the step 304, the restriction of the use of the carrier number i is removed in the step 306.

Thereafter, the use of the carrier numbers 1 to m is restricted in accordance with the result of judgment relating to the carrier number m+1 in the step 307 to the step 309 while the use of the carrier numbers n−m+1 to n is restricted in accordance with the result of judgment relating to the carrier number n−m in the step 310 to the step 312.

Meanwhile, in the case of in the present embodiment, the number Ft of the time slots per measurement period is preferably determined also with reference to the frame frequency Fb of the wireless communication system B in addition to the frame frequency Fa of the wireless communication system A, for example, on the basis of the least common multiple of Fa and Fb.

As explained above, in accordance with the present invention, it is possible to detect broad band interfering signals transmitted from another system, which signals had not easily been separated in accordance with in the prior art technique, by the use of the signal receiving unit of its own system, and therefore becomes possible to automatically limit the use of the communication link in which interference is detected and to automatically remove the limitation of the communication link when the interference disappears, resulting in an effective interference avoiding mechanism. Furthermore, in accordance with the present invention, it is also possible to reduce the fixed guard-band interval between adjacent two wireless communication systems, to adaptively secure a frequency band equivalent to a necessary guard-band interval, and therefore to provide a link controlling method and a wireless communication device in which effective use of the frequency resource is possible maintaining the freedom of designing and installing the two wireless communication systems, The foregoing description of preferred embodiments has been presented for the purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An interference detection method for detecting interference between one system making use of a communication method including frequency division multiplexing and time division multiplexing and another system making use of a communication method different from the communication method of said one system, said interference detection method comprising:
    a step (1) of measuring a received signal level for each of frequencies corresponding to carrier numbers in said one system;
    a step (2) of storing the received signal levels as measured in association with the respective carrier numbers;
    a step (3) of generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;
    a step (4) of comparing the results of the arithmetic operation as stored corresponding to the respective carrier numbers with a predetermined interference threshold level; and
    a step (5) of storing each comparison result in association with the selected carrier number,
    the received signal level is measured for each unit time corresponding to the slot numbers in said step (1),
    the received signal level as measured is stored for each carrier number and each time slot in said step (2), and
    the measured level groups are generated from the respective received signal levels as stored, each measured level group including the received signal levels which are measured in the time slots corresponding to said selected carrier numbers and the time slot numbers adjacent to said selected carrier numbers in a predetermined range, and subjected to an arithmetic operation respectively followed by storing each result of the arithmetic operation in association with the selected carrier number in said step (3).

2. An interference detection method for detecting interference between one system making use of a communication method including frequency division multiplexing and time division multiplexing and another system making use of a communication method different from the communication method of said one system, said interference detection method comprising:
    a step (1) of measuring a received signal level for each of frequencies corresponding to carrier numbers in said one system;
    a step (2) of storing the received signal levels as measured in association with the respective carrier numbers;
    a step (3) of generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a step (4) of comparing the results of the arithmetic operation as stored corresponding to the respective carrier numbers with a predetermined interference threshold level; and a step (5) of storing each comparison result in association with the selected carrier number, the received signal level is measured for each unit time corresponding to the slot numbers in said step (1), the received signal level as measured is stored for each carrier number and each time slot in said step (2), and the measured level groups are generated from the respective received signal levels as stored, each measured level group including the received signal levels which are measured in a predetermined number of time slots corresponding to said selected carrier number, and subjected to an arithmetic operation respectively followed by storing each results of the arithmetic operation in association with the selected carrier number in said step (3).

3. The interference detection method as claimed in claim 2, wherein said predetermined number is the number of all the time slots belonging to said selected carrier number.

4. An interference detection method for detecting interference between one system making use of a communication method including frequency division multiplexing and time division multiplexing and another system making use of a communication method different from the communication method of said one system, said interference detection method comprising:

a step (1) of measuring a received signal level for each of frequencies corresponding to carrier numbers in said one system;

a step (2) of storing the received signal levels as measured in association with the respective carrier numbers;

a step (3) of generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a step (4) of comparing the results of the arithmetic operation as stored corresponding to the respective carrier numbers with a predetermined interference threshold level;

a step (5) of storing each comparison result in association with the selected carrier number, and said arithmetic operation is such that a minimum level is obtained among from each said measured level groups.

5. An interference detection method for detecting interference between one system making use of a communication method including frequency division multiplexing and time division multiplexing and another system making use of a communication method different from the communication method of said one system, said interference detection method comprising:

a step (1) of measuring a received signal level for each of frequencies corresponding to carrier numbers in said one system;

a step (2) of storing the received signal levels as measured in association with the respective carrier numbers;

a step (3) of generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a step (4) of comparing the results of the arithmetic operation as stored corresponding to the respective carrier numbers with a predetermined interference threshold level; and a step (5) of storing each comparison result in association with the selected carrier number, and said arithmetic operation is such that an average level is obtained among from each said measured level groups.

6. An interference detection method for detecting interference between one system making use of a communication method including frequency division multiplexing and time division multiplexing and another system making use of a communication method different from the communication method of said one system, said interference detection method comprising:

a step (1) of measuring a received signal level for each of frequencies corresponding to carrier numbers in said one system;

a step (2) of storing the received signal levels as measured in association with the respective carrier numbers;

a step (3) of generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a step (4) of comparing the results of the arithmetic operation as stored corresponding to the respective carrier numbers with a predetermined interference threshold level; and a step (5) of storing each comparison result in association with the selected carrier number, wherein said arithmetic operation is such that a representative level is obtained among from each said measured level groups in accordance with majority decision.

7. An interference avoidance system for detecting avoiding interference between one system making use of a communication method including frequency division multiplexing and time division multiplexing and another system making use of a communication method different from the communication method of the one system, said interference detection system comprising:

a measurer for measuring a received signal level for each of frequencies corresponding to carrier numbers in said one system;

a received signal level memory for storing the received signal levels as measured in association with the respective carrier numbers;

an operation result memory for generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a threshold level comparer for comparing the results of the arithmetic operation as stored corresponding to the respective carrier numbers with a predetermined interference threshold level;

a carrier number memory for storing each comparison result in association with said selected earner number;

a communication link controller for controlling carrier numbers for use on the basis of the selected carrier number as stored in said carrier number memory, said measurer measures the received signal level for each unit time corresponding to the slot numbers, said received signal level memory stored the received signal level as measured for each carrier number and each time slot, and said operation result memory generates the measured level groups from the respective received signal levels as stored, each measured level group including the received signal levels which are measured in the time slots corresponding to said selected carrier number and the time slot numbers adjacent to said selected carrier number in a predetermined range, and performs an arithmetic operation respectively followed by storing each result of the arithmetic operation in association with said selected carrier number.

8. The interference avoidance system as claimed in claim 7, further comprising an initiating unit for initiating measurement of said received signal level, said arithmetic operation, comparison with said threshold level, storage of a carrier number, and updating the result of detecting interference.

9. An interference avoidance system for detecting avoiding interference between one system making use of a communication method including frequency division multiplexing and time division multiplexing and another system making use of a communication method different from the communication method of the one system, said interference detection system comprising:

a measurer for measuring a received signal level for each of frequencies corresponding to carrier numbers in said one system;

a received signal level memory for storing the received signal levels as measured in association with the respective carrier numbers;

an operation result memory for generating a measured level group from respective carrier numbers in said one system which are selected one after another and a plurality of carrier numbers adjacent to a selected carrier number in said one system, performing an arithmetic operation of each of the respective measured level groups, and storing each result of the arithmetic operation in association with said selected carrier number;

a threshold level comparer for comparing the results of the arithmetic operation as stored corresponding to the respective carrier numbers with a predetermined interference threshold level;

a carrier number memory for storing each comparison result in association with said selected carrier number; and a communication link controller for controlling carrier numbers for use on the basis of the selected carrier number as stored in said carrier number memory, and said measurer measures the received signal level for each unit time corresponding to the slot numbers, said received signal level memory stores the received signal level as measured for each carrier number and each time slot, and said operation result memory generates the measured level groups from the respective received signal levels as stored, each measured level group including the received signal levels which are measured in a predetermined number of time slots corresponding to said selected carrier number, and performs an arithmetic operation respectively followed by storing each results of the arithmetic operation in association with said selected carrier number.

10. The interference avoidance system as claimed in claim 9, wherein said predetermined number is the number of all the time slots belonging to said selected carrier number.

11. The interference avoidance system as claimed in claim 10, further comprising an initiating unit for initiating measurement of said received signal level, said arithmetic operation, comparison with said threshold level, storage of a carrier number, and updating the result of detecting interference.

12. The interference avoidance system as claimed in claim 9, further comprising an initiating unit for initiating measurement of said received signal level, said arithmetic operation, comparison with said threshold level, storage of a carrier number, and updating the result of detecting interference.

* * * * *